(12) United States Patent
Britton et al.

(10) Patent No.: US 11,697,124 B2
(45) Date of Patent: Jul. 11, 2023

(54) RELOCATING CANNABIS TRICHOME SEPARATOR

(71) Applicants: Benjamin Britton, Conifer, CO (US); Kyle Manuel, Arvada, CO (US)

(72) Inventors: Benjamin Britton, Conifer, CO (US); Kyle Manuel, Arvada, CO (US)

(73) Assignee: PUREPRESSURE, LLC, Denver, CO (US)

( * ) Notice: Subject to any disclaimer, the term of this patent is extended or adjusted under 35 U.S.C. 154(b) by 0 days.

(21) Appl. No.: 17/643,780

(22) Filed: Dec. 10, 2021

(65) Prior Publication Data

US 2022/0184632 A1    Jun. 16, 2022

Related U.S. Application Data

(60) Provisional application No. 63/124,806, filed on Dec. 13, 2020.

(51) Int. Cl.
| | |
|---|---|
| *B03B 9/00* | (2006.01) |
| *B01F 23/53* | (2022.01) |
| *B01D 11/02* | (2006.01) |
| *B03B 5/48* | (2006.01) |
| *B01F 23/50* | (2022.01) |
| *B01F 27/806* | (2022.01) |

(52) U.S. Cl.
CPC ............ *B03B 9/00* (2013.01); *B01D 11/0207* (2013.01); *B01D 11/0257* (2013.01); *B01D 11/0288* (2013.01); *B01F 23/51* (2022.01); *B01F 23/53* (2022.01); *B01F 27/806* (2022.01); *B03B 5/48* (2013.01)

(58) Field of Classification Search
CPC .............. B01D 11/027; B01D 11/0257; B01D 11/0288; B03B 5/48; B03B 9/00; B01F 23/51; B01F 23/53; B01F 27/806
USPC .......................................................... 209/11
See application file for complete search history.

(56) References Cited

U.S. PATENT DOCUMENTS

| | | | |
|---|---|---|---|
| 8,640,877 B1 * | 2/2014 | Pastorius ........... | B01D 11/0219 209/44 |
| 10,051,998 B2 * | 8/2018 | Boozer ............... | A47J 43/0727 |
| | (Continued) | | |

FOREIGN PATENT DOCUMENTS

| | | | | |
|---|---|---|---|---|
| CN | 103930739 A | * | 7/2014 | .............. F25C 5/002 |
| CN | 106457176 B | * | 12/2019 | .......... A47J 43/0727 |
| | (Continued) | | | |

*Primary Examiner* — Terrell H Matthews
(74) *Attorney, Agent, or Firm* — Burns & Levinson, LLP; Daniel McGrath, Esq.

(57) ABSTRACT

A *Cannabis* trichome separator. At least one storage vessels are provided, each vessel having an open top and adapted to receive a plant material and chilled or ice water mixture. A mechanism for agitating the mixture is also provided. Another mechanism raises, lowers, and pivots the agitating mechanism, so the agitating mechanism can be placed over the open top of each of the at least one storage vessels. The mixture can be agitated in each of the storage vessels, seriatim. Also disclosed is a method for processing raw plant material. A plant material and chilled or ice water is introduced into each of at least one storage vessels. The agitating mechanism agitates the mixture in a first of the storage vessels, pivoting the agitating mechanism from a first position to a second position, and agitating the mixture in subsequent storage vessels, seriatim.

12 Claims, 16 Drawing Sheets

(56) References Cited

U.S. PATENT DOCUMENTS

| | | | |
|---|---|---|---|
| 10,780,442 B2 * | 9/2020 | Pal | .......................... A24B 15/00 |
| 2019/0263079 A1 * | 8/2019 | Britton | .................... B30B 15/34 |
| 2019/0283038 A1 * | 9/2019 | Cilia | ........................ B03B 7/00 |
| 2021/0223276 A1 * | 7/2021 | Xie | ........................ B01F 31/441 |
| 2021/0363462 A1 * | 11/2021 | Castellanos | ............. B01F 31/81 |
| 2022/0184632 A1 * | 6/2022 | Britton | ..................... B03B 9/00 |

FOREIGN PATENT DOCUMENTS

| | | | | |
|---|---|---|---|---|
| EP | 1050497 A1 * | 11/2000 | ............. | B65G 65/23 |
| KR | 102255231 B1 * | 2/2021 | | |
| KR | 102255231 B1 * | 5/2021 | | |
| RU | 2570452 C2 * | 12/2015 | ........ | B01F 15/00253 |
| WO | WO-2015173688 A1 * | 11/2015 | .......... | B01F 13/0038 |
| WO | WO-2022139602 A1 * | 12/2021 | | |
| WO | WO-2022139602 A1 * | 6/2022 | | |

* cited by examiner

RELOCATING CANNABIS TRICHOME SEPARATOR

RELATED PATENT APPLICATION

The present application is related to U.S. provisional patent application for RELOCATING *CANNABIS* TRICHOME SEPARATOR, application No. 63/124,806, filed Dec. 13, 2020, the full disclosures of which are hereby incorporated by reference and priority of which are hereby claimed.

FIELD OF THE INVENTION

The present invention relates to methods and apparatus for separating and extracting resin-rich glands from raw *Cannabis* plants and, more particularly, for using a relocating *Cannabis* trichome separator to process plant material in one or more storage vessels, seriatim.

BACKGROUND OF THE INVENTION

As the *Cannabis* industry evolves, so do the requirements for processed *Cannabis* concentrates. In a market where most products are produced using solvent-based techniques, alternative extraction methods are desirable for several reasons. Primary concerns revolve around safety as well as the costs associated to operate this equipment safely with an active explosion hazard present. Other reasons are more customer-centric and relate to a clean *Cannabis* concentrate or more specifically a concentrate that closely resembles the original qualities of the plant with minimal alteration.

The process of collecting resin glands from the *Cannabis* plant using ice water has been performed for decades. Freshly frozen *Cannabis* material that has not undergone curing or drying is placed into a bath of chilled or ice water. The water soaks into the non-resinous plant material, giving it some suppleness and flexibility. The resin-rich glands, however, become frozen and brittle at these near-freezing temperatures. The mixture is then agitated, causing the brittle resin glands to sever and separate from the plant material. The resin glands are then filtered and collected from the water bath and dried (usually in a freeze dryer) at which point they are ready for sale or further processing.

For years, this process of agitation has been performed by hand with the use of a paddle and vessel. More recently, attempts have been made to commercialize this process automatically, but often quality is sacrificed. The frozen resin glands are extremely delicate, temperature sensitive and typically range in size from 25 to 200 microns in diameter. While there are many ways to separate and collect these resin glands, there are just as many ways to damage the product along the way. Over the years, the highest quality product has been found to come from a hand paddling agitation process. Hand paddling tends to create turbulence in the water without creating high shear forces that can damage trichomes and introduce small plant particulates into the ice water hash (the resin glands).

The process of ice water extraction starts by inserting an open wash mesh liner into a stainless-steel vessel with a false bottom. The mesh aperture typically ranges from 220-300 microns. The false bottom supports the mesh liner, leaving a 3" tall cavity between the liner and the vessel bottom. Next, the vessel is filled with filtered water and ice. Once the bath has properly stabilized to 32-35° F., fresh frozen *Cannabis* is introduced. The frozen *Cannabis* will soak for up to 30 minutes, or until the *Cannabis* is fully saturated. At this point, the material is ready to be agitated. Historically, the operator would use a hand paddle to stir and agitate the water with the intention of separating resin glands and allowing them to settle through the mesh liner and under the false bottom. The water is then drained by gravity or pump and filtered in a series of mesh filtration vessel liners. The resin glands are collected and sorted by size. This process is repeated as necessary until the desired resin gland collection is achieved. The wet slurries are placed onto trays, frozen and then dried in a freeze dryer. The dry resin glands may be sold as is to be smoked or vaporized. Alternatively, the resin glands can be further processed typically in a heated press to purify and refine the oil/resin. Furthermore, specific compounds can be isolated to create a wide variety of end products.

DESCRIPTION OF RELATED ART

U.S. Pat. No. 10,835,904 issued to Cilia for METHOD OF PLANT RESIN SEPARATION AND EXTRACTION, issued on Nov. 17, 2020, discloses a process for trichome separation from plant matter that deploys an ionic brine to induce oedemic transformation of disk cell to aid in releasing glandular trichomes. The brine can be agitated to further release disk cells from the plant tissue. The disk cell debris can be separated by sieving the larger trichomes and plant tissue particles that results from agitation and maceration. If the brine concentration is appropriately modified, the trichomes will float and the brine and the plant tissue fragments sink. The floating trichomes are then removed and rinsed and then dried or extracted further after drying.

U.S. Pat. No. 10,780,442 issued to Pal, et al. for *CANNABIS* TRICHOME SEPARATION USING CHILLED WATER, issued on Sep. 22, 2020, discloses a process for separating *Cannabis* trichomes by gently grinding *Cannabis* plant material, mixing it with chilled water, and then agitating the mixture. The trichomes, being made brittle by the lowered temperature of the water, fall off the plant material during agitation. The mixture is then filtered in multiple stages to obtain the trichomes in different size fractions, which are collected separately and then dried.

U.S. Pat. No. 10,512,938 issued to Watts, et al. for ROTARY SEPARATION APPARATUS AND PROCESS, issued on Dec. 24, 2019, discloses a rotary separation apparatus used in a process for separating resinous trichomes produced in plant trichome glands from unwanted plant matter. A liquid freezing agent is introduced into a container of the plant matter to fragment the undesirable matter while the desired portion rich in trichome remains intact.

U.S. Pat. No. 10,375,892 issued to Rose for PROCESS FOR PURIFYING GLANDULAR TRICHOMES, issued on Aug. 13, 2019, discloses a dry process for isolating clean glandular trichomes from a trichome bearing plant material, wherein the trichome bearing plant material is frozen at −20° C. and subject to shattering and softening sequence.

U.S. Pat. No. 8,640,877 issued to Pastorius for POLLEN separator, issued on Feb. 4, 2014, discloses a water and ice agitation method for processing raw plant material. Small diameter mixtures of plant pollen and plant debris are filtered from eight various micron filters. The agitator tub agitates screen bags holding raw plant material and ice, to break down various parts of the plant into a process water solution. This solution is pumped back and forth between two process reservoirs, each supporting two strainer columns. Each strainer column has a pair of buckets. Each bucket has a different micron filter bag supported in it.

U.S. Pat. No. 9,066,910 issued to Rosenblatt, et al. for METHODS AND COMPOSITIONS OF *CANNABIS* EXTRACTS, issued on Jun. 30, 2015, discloses a method for obtaining an extract from a *Cannabis* plant. In one embodiment, the method comprises (a) providing *Cannabis* flower trimmings with trichome material, (b) providing clean, cold water to at least cover *Cannabis* the *Cannabis* flower trimmings, (c) agitating the mixture of *Cannabis* flower trimmings and water, (d) soaking the *Cannabis* flower trimming in cold water for at least one minute, (e) removing *Cannabis* flower trimmings from the water, (f) removing the trichome material from the water, and (g) drying the trichome material to contain no more than 10% total water weight.

U.S. Pat. No. 6,158,591 issued to Delp for METHOD AND APPARATUS FOR EXTRACTING PLANT RESINS, issued on Dec. 12, 2000, discloses a method and apparatus for extracting resin from plant material. The method uses cold water in a wash process to cause resins to become brittle, while the remaining plant material becomes more flexible. Separation is accomplished using an extractor having a washing chamber with an open top and a screen filter disposed above a settling chamber. A collection bottle is placed below a valve and may include a filter to separate resin particles from the solute. The washing chamber is first filled with cold water and then a quantity of plant material is placed therein, followed by an ice layer. An agitator is then actuated to mix the contents to separate the resins. The settled resin is thereafter captured by the filter upon opening the valve.

None of the aforementioned patents include a *Cannabis* trichome separator with a servo-drive motor and agitating mechanism that can relocate to allow users to wash in at least one vessel. Moreover, none of the references above include a touchscreen control panel coupled with a joystick that allows users full control of agitation mechanism. Thus, there is a need in the art for relocating *Cannabis* trichome separator with improved functionality, performance, and design.

SUMMARY OF THE INVENTION

In accordance with the present invention, there is provided a *Cannabis* trichome separator. At least one cylindrical storage vessels are provided, each vessel having an open top and adapted to receive a plant material and chilled or ice water mixture. A mechanism for agitating the mixture is also provided. Another mechanism raises, lowers, and pivots the agitating mechanism, so the agitating mechanism can be placed over the open top of each of the storage vessels. The mixture can be agitated in each of the storage vessels, seriatim. Also disclosed is a method for processing raw plant material. A plant material and chilled or ice water is introduced into each of one or more storage vessels. The agitating mechanism agitates the mixture in a first of the storage vessels, pivoting the agitating mechanism from a first position to a second position, and agitating the mixture in subsequent cylindrical storage vessels, seriatim.

It is therefore an object of the invention to provide a system for processing raw plant material.

It is a further object of the present invention to provide a system for agitating plant material and chilled or ice water to separate and extract resin-rich glands from *Cannabis* plants.

It is another object of the present invention to provide a plurality of storage vessels and a relocating *Cannabis* trichome separator that processes plant material in the plurality of storage vessels, seriatim.

These and other objects and advantages of the present invention are more readily apparent with reference to the following detailed description and the accompanying drawings.

BRIEF DESCRIPTION OF THE DRAWINGS

A complete understanding of the present invention may be obtained by reference to the accompanying drawings, when considered in conjunction with the subsequent detailed description, in which.

Like reference numerals refer to like parts throughout the several views of the drawings.

DETAILED DESCRIPTION OF THE PREFERRED EMBODIMENT

Figure 1:
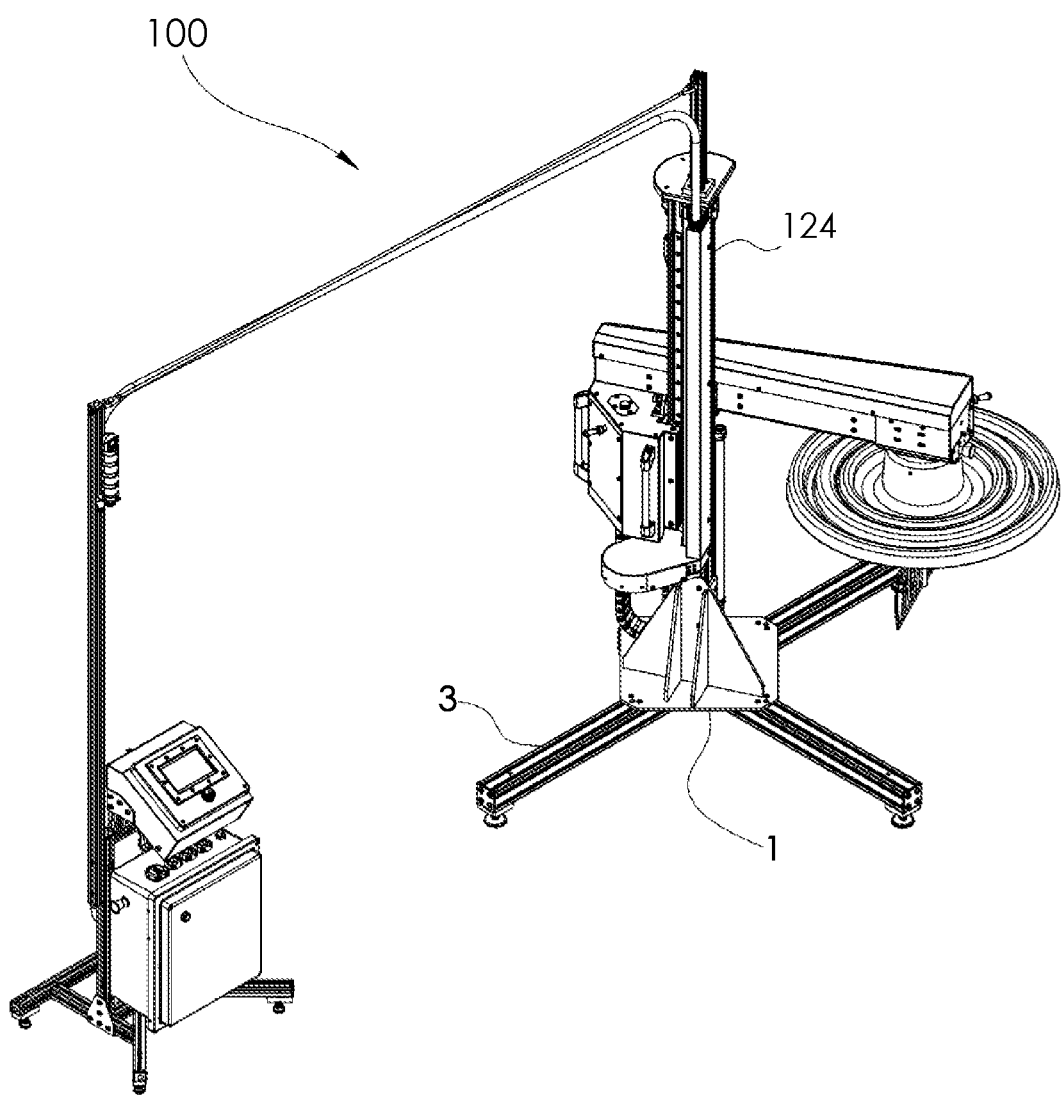
FIG. 1 is a perspective schematic view of a relocating *Cannabis* trichome separator without the storage vessels.

Although the following detailed description contains specific details for the purposes of illustration, those of ordinary skill in the art will appreciate that variations and alterations to the following details are within the scope of the invention. Accordingly, the exemplary embodiments of the invention described below are set forth without any loss of generality to, and without imposing limitations upon, the claimed invention.

A *Cannabis* trichome separator is provided. At least one storage vessel each has an open top and is adapted to receive a plant material and chilled or ice water mixture. A mechanism for agitating the mixture is also provided. Another mechanism raises, lowers, and pivots the agitating mechanism, so the agitating mechanism can be placed over the open top of each of the storage vessels. The mixture can be agitated in each of the storage vessels, seriatim. Also disclosed is a method for processing raw plant material using the foregoing apparatus.

The relocating *Cannabis* trichome separator is designed to replicate the agitation created from the hand paddling process. More specifically, turbulence is achieved without creating high shear forces. An agitation mechanism has multiple degrees of freedom and can relocate between the at least one storage vessel positions as well as move up and down to engage either vessel. A pneumatic spring and cylinder assist the operator in lifting the agitation mechanism with almost no effort. The pivoting design also allows the operator to achieve nearly 100% machine utilization by processing one batch while another batch is being filtered and collected.

Vessels of various sizes are easily rolled into position and key into a universal guard concentrically. The guard is easily removed for cleaning and maintenance. Interchangeable paddles are quickly attached to the drive shaft, allowing for a variety of vessel sizes and methods of agitation.

Processing facilities may encounter various equipment size constraints and therefore the separator is capable of being mounted in a variety of configurations. The standard "T" base is freestanding and supports the use of both vessel stations in a modular configuration. An optional "U" base is freestanding and more compact than the "T" base, but only supports the use of a single vessel station. An optional bolt down base removes the lower structural members from the separator and allows for directly bolting the separator to a concrete floor and the use of both vessel stations.

A remotely located control panel contains a touchscreen interface, rotary joystick, power switch, motor enable button, emergency stop button, and light indicator tower.

A touchscreen interface and rotary joystick allow a user to record or create custom patterns and recipes that replicate hand paddling agitation. Patterns represent short, discrete movements, intended to be looped (repeated) to create motion that mimics the movements used in hand paddling. The looping of a pattern is considered a recipe. Recipes are defined as a string of one or more looping patterns, which may be created using the joystick which directly controls the motion of the paddle or using a table within the touchscreen interface. Recipes may be recorded during a live production run where the operator is building the recipe as the process continues. Alternatively, the operator can program or edit a recipe using the touchscreen interface.

The entire wash process of agitating, settling, draining, filtering, and collecting is typically repeated three or more times before a batch is considered complete. In a standard facility, the settling, draining, filtering, and collecting process takes about 30 minutes per wash. The pivoting design of the separator allows the operator to finish agitating a first vessel and then quickly and easily relocate the agitation mechanism to a second vessel to start the agitation process. While the second vessel is agitating, the operator may tend to the first vessel. A properly timed operation can achieve almost 100% machine utilization, which is essentially double that of a machine with an agitation mechanism tied to the vessel. In turn, the customer may achieve nearly double the product output of a comparably sized machine.

When comparing this to hand agitation, the same volume of material may be processed with one less operator, resulting in significant labor savings.

Referring now to FIG. 1, there is shown a perspective view of a relocating *Cannabis* trichome separator 100. Separator 100 is stabilized with a set of four structural legs 3 affixed to a main vertical frame member 124 via a welded aluminum bracket 1.

Figure 2:
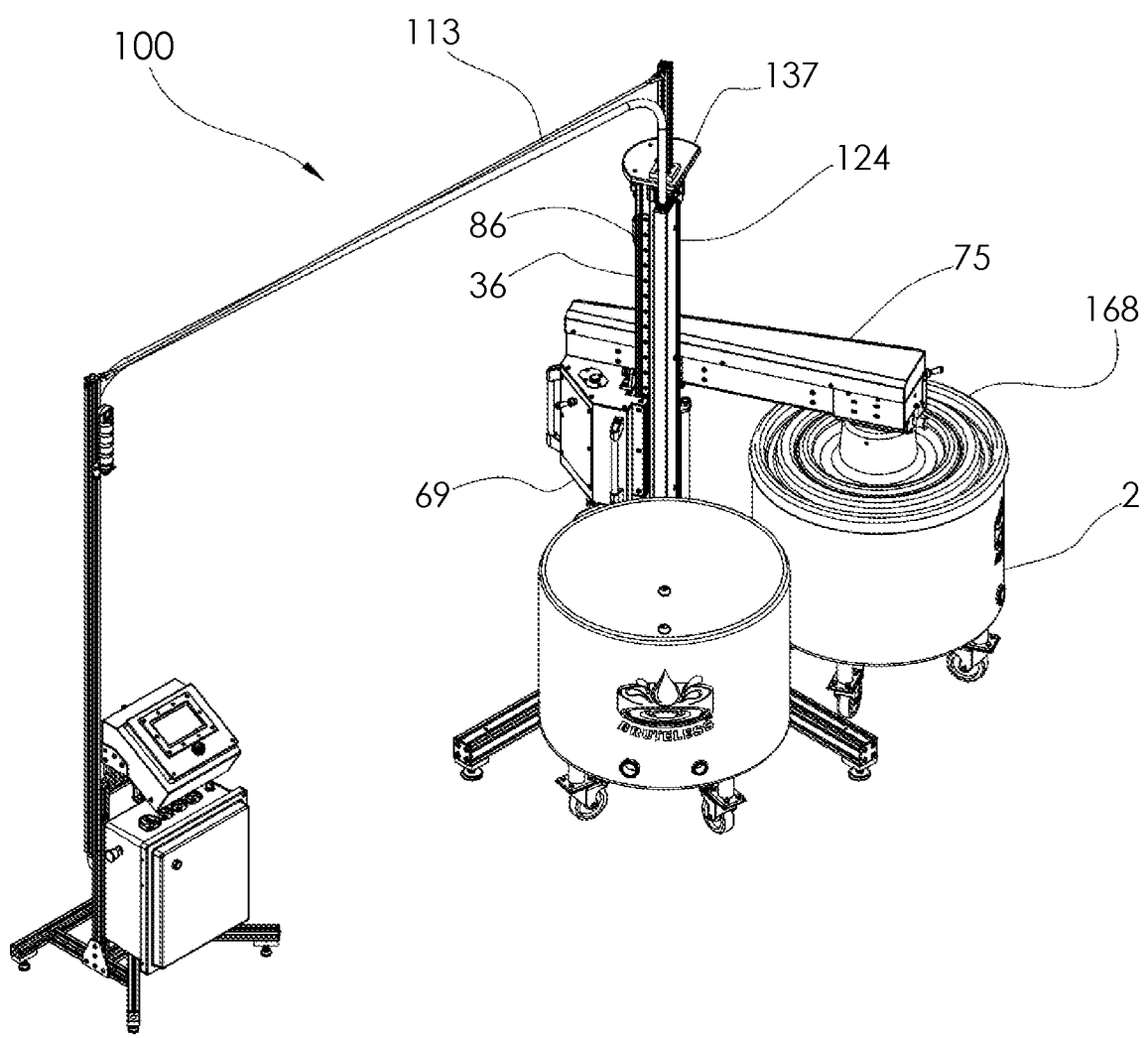
FIG. 2 is a perspective schematic view of a relocating *Cannabis* trichome separator with the agitation mechanism lowered over a storage vessel.
Figure 6:
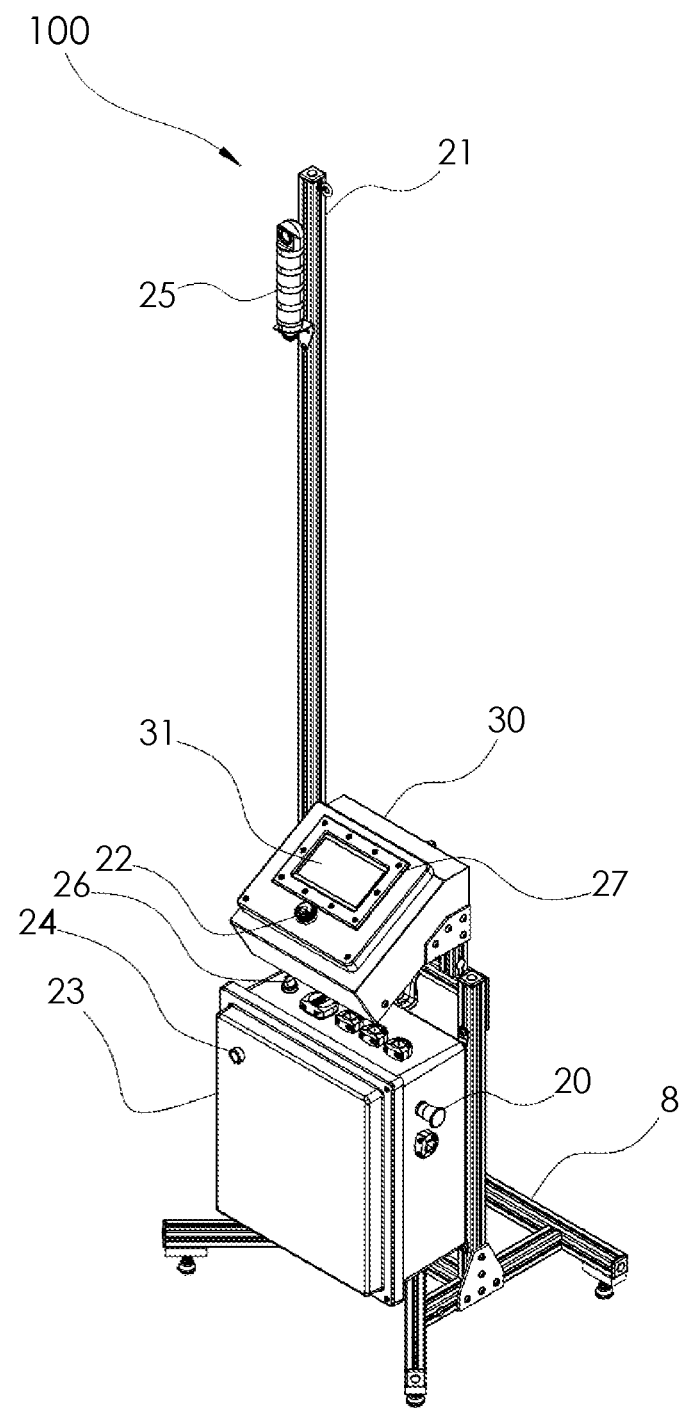
FIG. 6 is a front schematic view of a control panel for use with the separator shown in FIGS. 1-5.

Referring now to FIG. 2, A pivoting vertical frame member 36 is connected to the main vertical frame member 124 with a set of hinges. Pivoting vertical frame member 36 may be locked into one of two positions with the use of a spring plunger, not shown, which engages with a pivoting bracket 137. An agitation mechanism 75 of separator 100 is lowered in the first position above a 65-gallon storage vessel 2 and an associated universal guard 168. Agitation mechanism 75 may travel up and down approximately 22" in the preferred embodiment along two linear rails 86 and four roller bearing blocks, not shown. At the top of agitation mechanism travel, a spring plunger engages to ensure agitation mechanism 75 is held in place. A main enclosure 69 covers an electric motor and drive system, not shown, protecting a user from any hazards. A cable strain relief 113 is provided for cables as they exit separator 100 to be routed across a ceiling and over to a remotely located control panel (FIG. 6).

Figure 3:
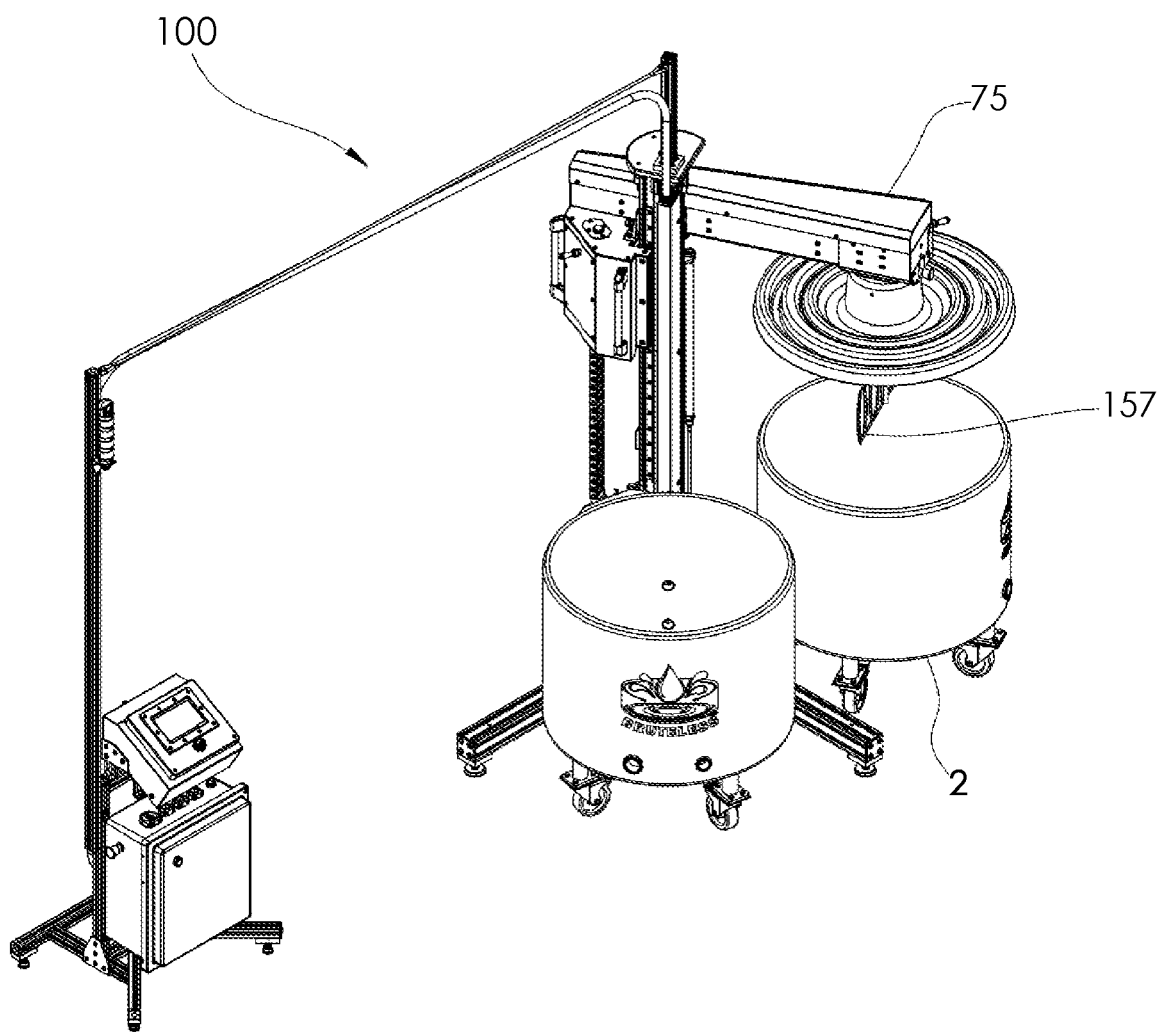
FIG. 3 is a perspective schematic view of the separator shown in FIG. 2 with the agitation mechanism raised over a storage vessel.

Referring now to FIG. 3, there is shown a perspective view of the separator 100 of FIG. 2 with the agitation mechanism raised over a 65-gallon vessel 2. A removable paddle 157 is removably attached to agitation mechanism 75 as described in greater detail with respect to FIG. 7, infra.

Figure 4:
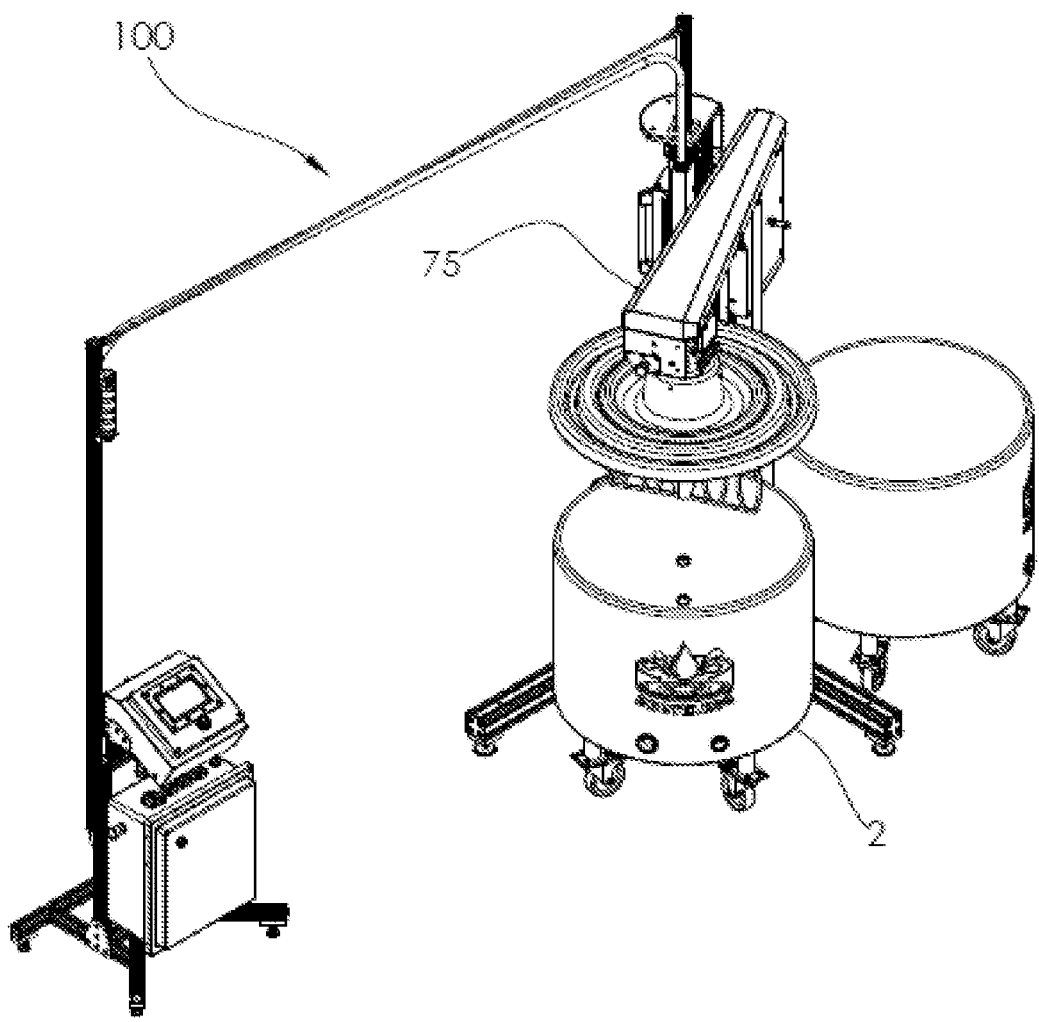
FIG. 4 is a perspective schematic view of the separator with an agitation mechanism raised over a second storage vessel.

Referring now to FIG. 4, there is shown a perspective view of separator 100 with agitation mechanism 75 raised over a second 65-gallon vessel 2.

Figure 5:
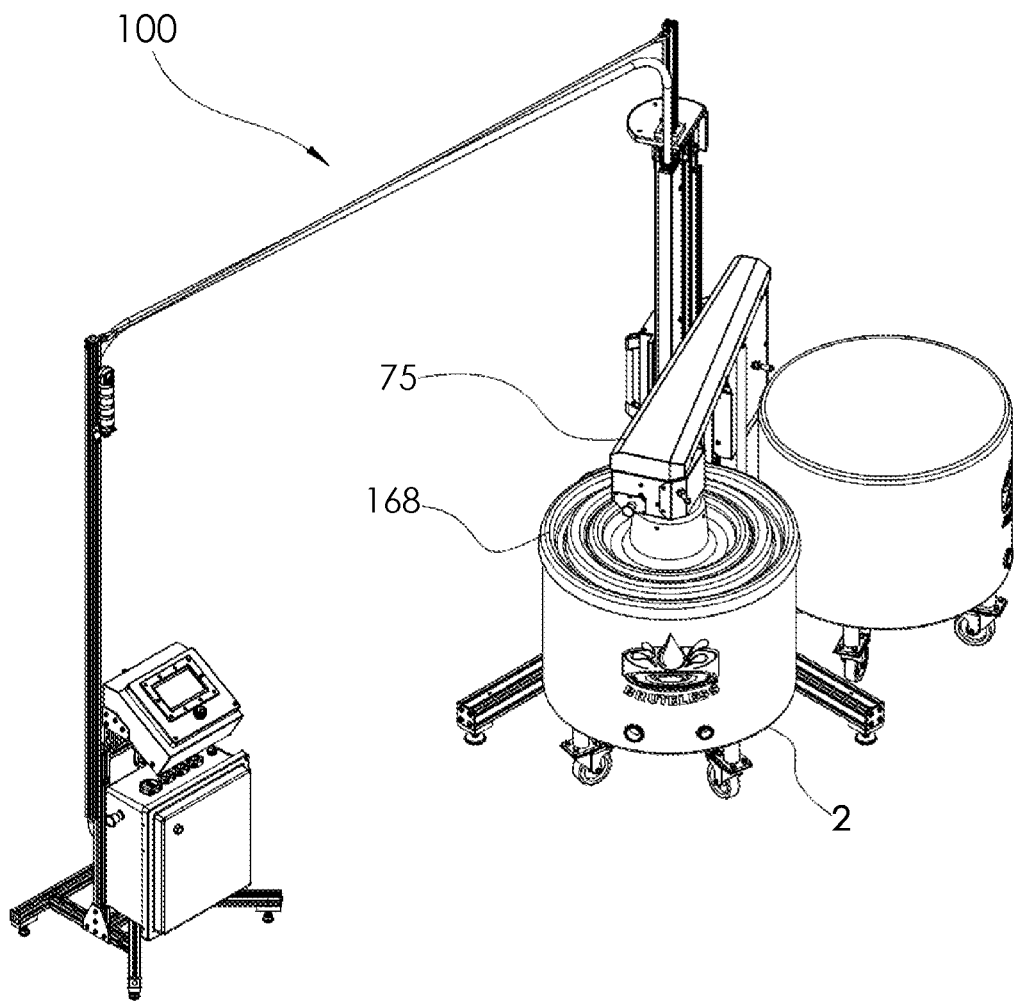
FIG. 5 is a perspective schematic view of the separator with an agitation mechanism lowered in position over a second storage vessel.

Referring now to FIG. 5, there is shown a perspective view of separator 100 with agitation mechanism 75 lowered over the second vessel 2, universal guard 168 being engaged therewith.

Referring now to FIG. 6, there is shown a front schematic view of a control panel for use with separator 100. Control panel consists of a control panel frame 8 to which are attached two IP65 electrical enclosures. An upper electrical enclosure 30 is angled to provide an ergonomic interface with an included touchscreen 31 and joystick 22. A custom bezel 27 seals touchscreen 31 to upper electrical enclosure 30 with two gaskets, not shown. A lower electrical enclosure 23 houses most of the electrical components including a power switch 26, emergency stop button 20, motor enable button 24, indicator light 25; also not shown, a breaker panel, motor drive, power supply, micro-controller, and safety controls. A frame allows for extra cabling to be coiled and secured to the back of the control panel, not shown. Electrical cables are routed vertically to a strain relief support 21 where they may continue across a ceiling, not shown, and over to separator 100.

Figure 7:
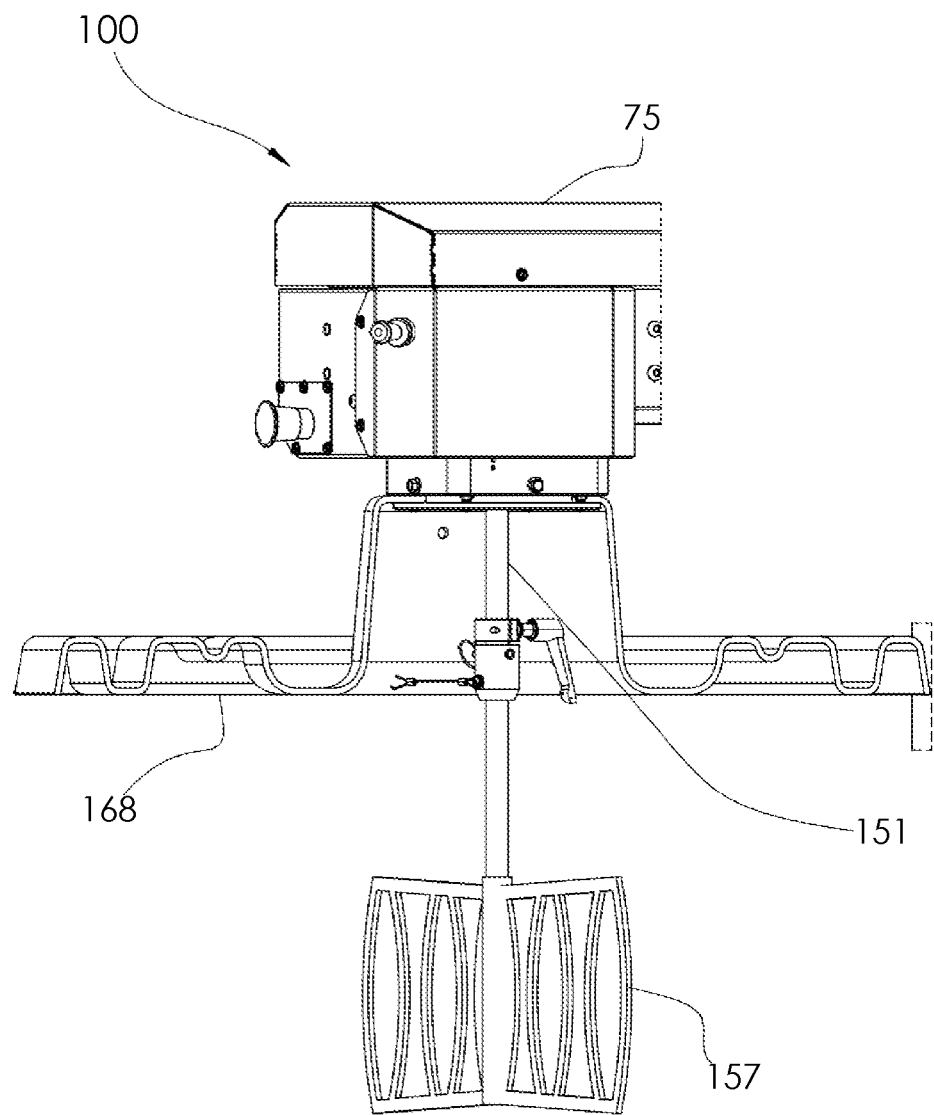
FIG. 7 is a front cross-sectional view of a paddle attached to the drive shaft.

Referring now also to FIG. 7, there is shown a front schematic view of a removable paddle 157 attached to separator 100. Removable paddle 157 is fixed to a paddle drive shaft 151 via a quick disconnect shaft coupler. Universal guard 168 is attached to agitation mechanism 75 and may be removed easily for cleaning purposes.

Figure 8:
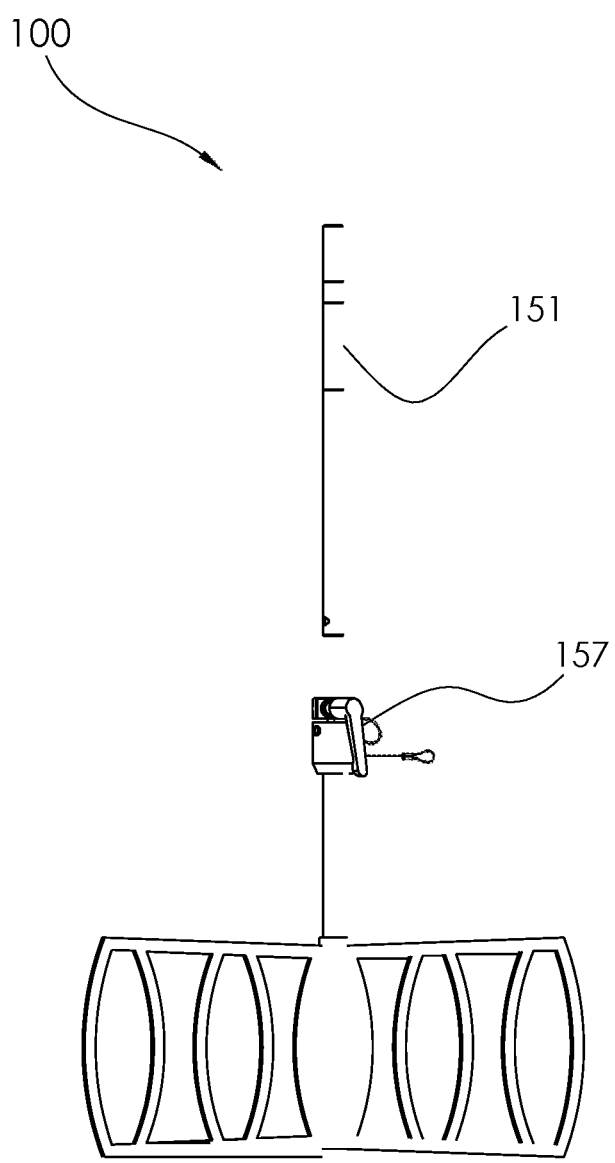
FIG. 8 is an isolated front schematic view of the paddle shown in FIG. 6 detached from the quick connect coupler on the drive shaft.

Referring now to FIG. 8, there is shown a front schematic view of removable paddle 151 detached from the quick connect coupler on the paddle drive shaft 157.

Figure 9:
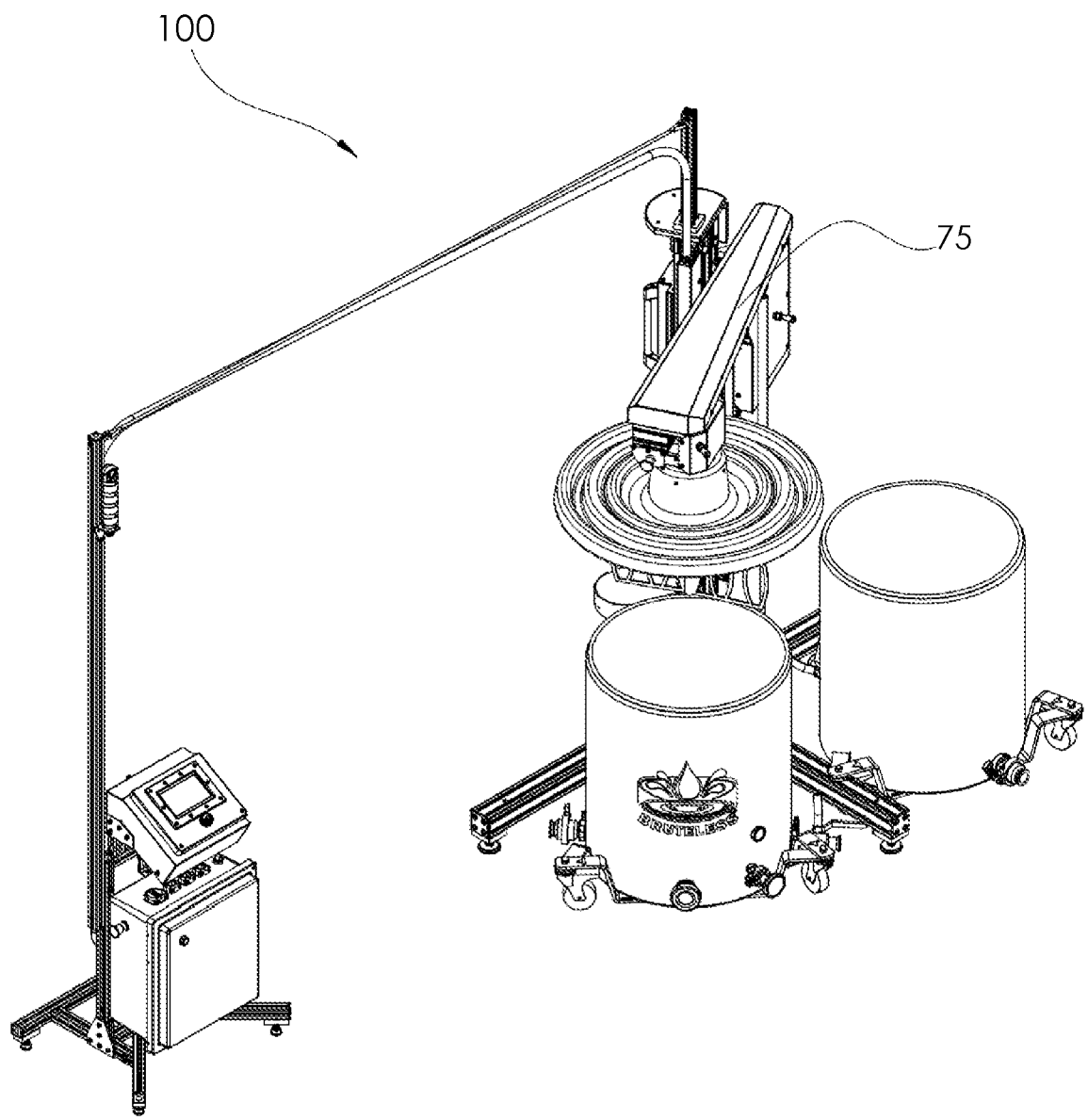
FIG. 9 is a perspective schematic view of the separator with an agitation mechanism raised over a 44-gallon storage vessel.

Referring now also to FIG. 9, there is shown a perspective schematic view of separator 100 with agitation mechanism 75 raised over a 44-gallon storage vessel, which can be substituted for a 65-gallon vessel. A corresponding paddle size is supplied with a quick connect coupler to match the vessel diameter.

Figure 10:
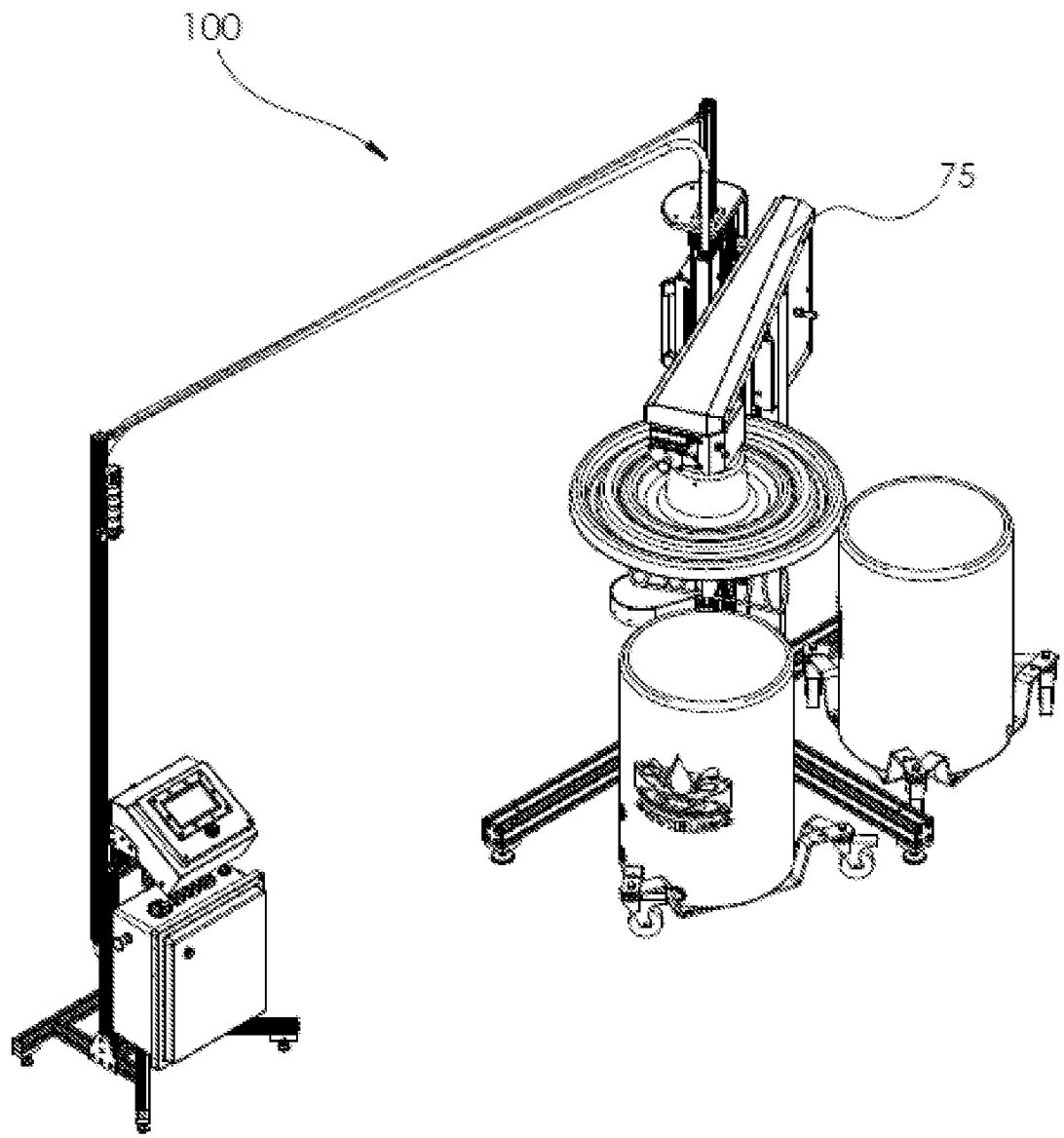
FIG. 10 is a perspective schematic view of the separator with 30-gallon storage vessels.

Referring now also to FIG. 10, there is shown a perspective schematic view of the separator with 30-gallon storage vessels, which can be substituted for 65-gallon vessels. A corresponding paddle size is supplied with a quick connect coupler to match the vessel diameter.

Figure 11:
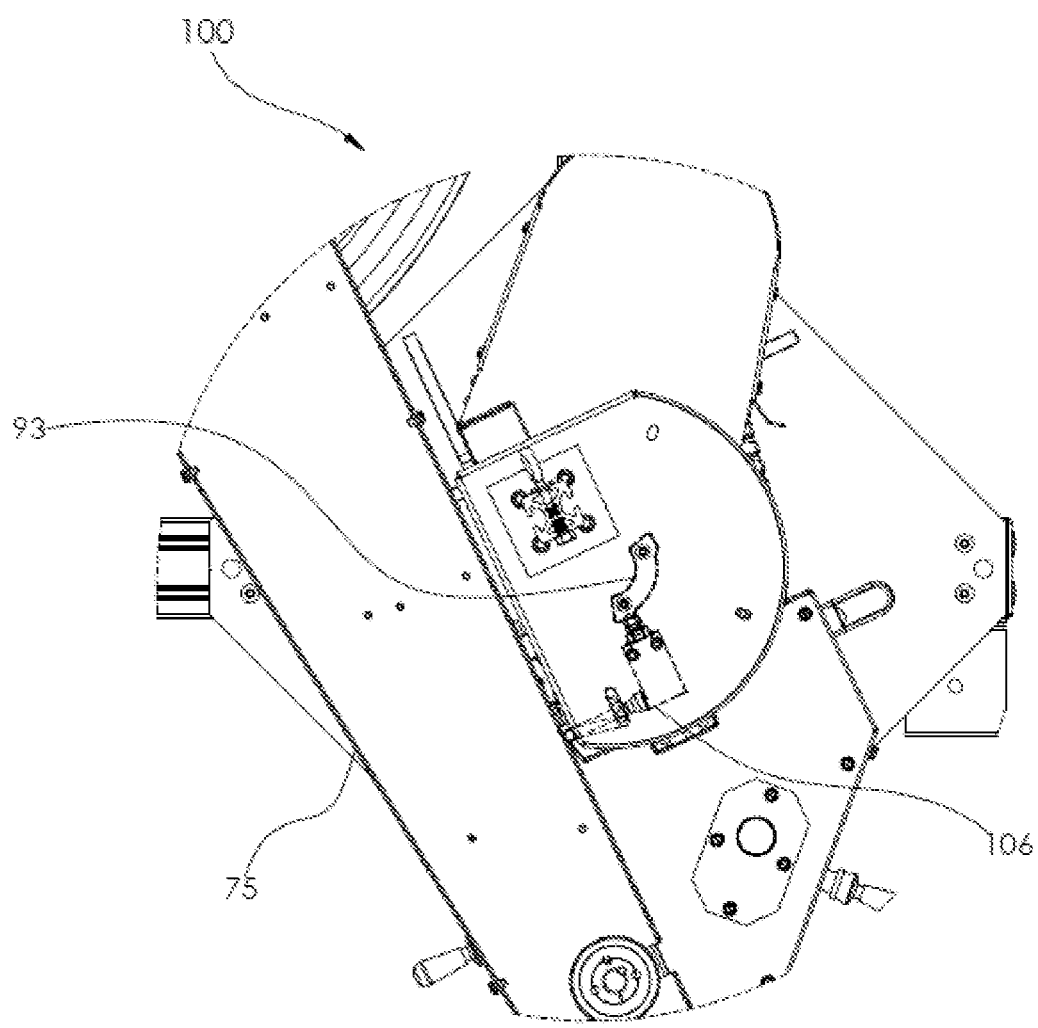
FIG. 11 is an isolated top schematic view of an axial interlock mechanism.

Referring now also to FIG. 11, there is shown a top schematic view of an interlock mechanism. Multiple safety interlock switches ensure that the machine is in a safe state before applying power to a motor. The separator 100 contains three limit switches. First, an agitation mechanism attached to the interlock switch must be in one of two axial positions and not in the middle of travel between the two positions. Second, the agitation mechanism must be lowered such that a universal guard is concentric with the vessel lip. If a storage vessel is off-center, the agitation mechanism does not lower sufficiently to engage this safety interlock. Lastly, the universal guard compresses against the pivoting agitation mechanism to engage a final interlock. Once this spring-loaded mechanism is compressed and the agitation mechanism is locked into position, all three interlocks are satisfied. Now, an operator can push a motor enable button on a control panel and start the agitation process.

The first interlock mechanism, shown in FIG. 11, is referred to as the axial interlock. It ensures that agitation mechanism 75 is pivoted and locked in one of two positions. A roller-style axial limit switch 106 travels along an axial feed dog 93. At either end of the travel, an axial feed dog 93 engages an axial limit switch 106 and closes this portion of a safety circuit. If the agitation mechanism 75 is pivoted off of the axial feed dog 93, axial limit switch 106 opens and cuts power to the motor, requiring all three interlock switches to be satisfied before the motor enable button may be pushed, allowing the motor to be restarted.

Figure 12:
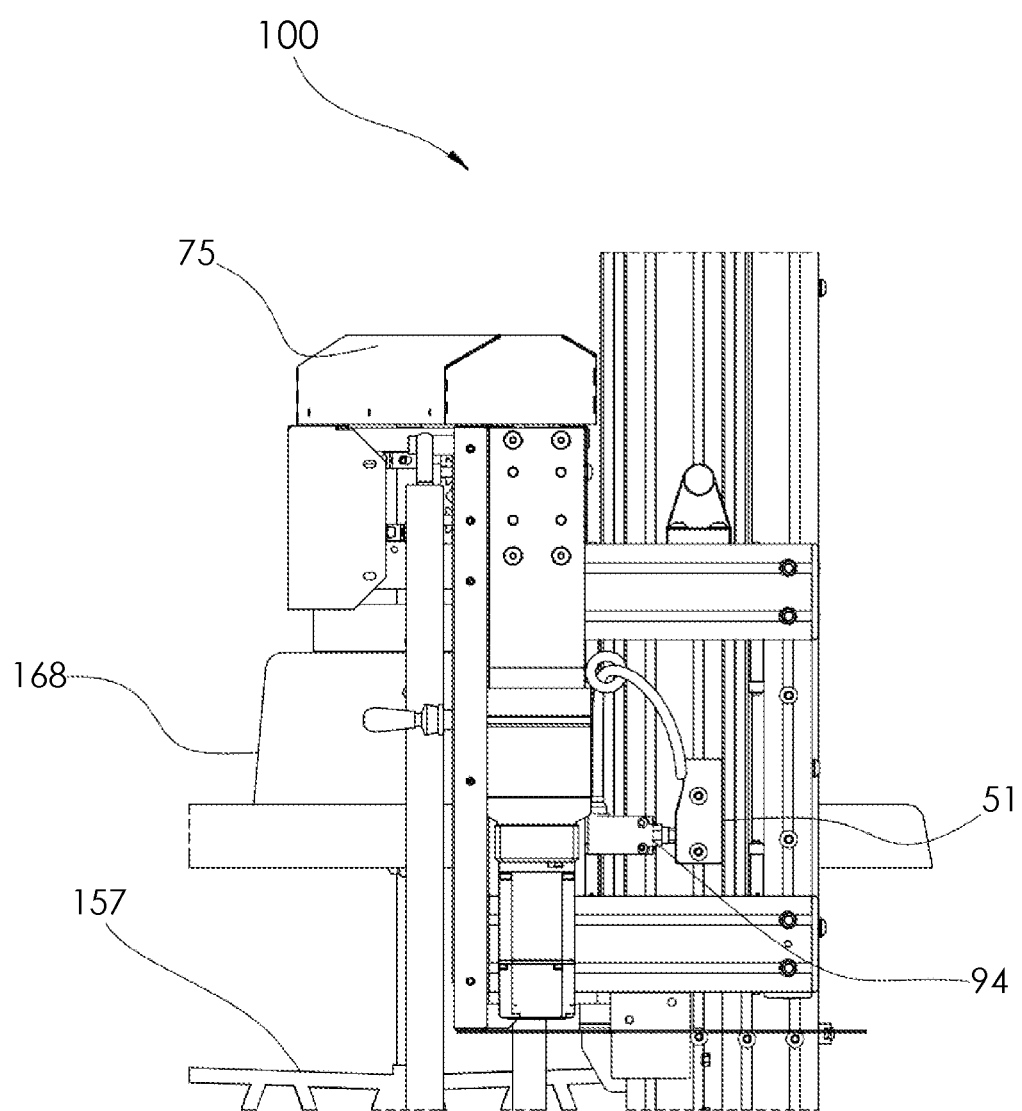
FIG. 12 is an isolated side schematic view of a vertical interlock mechanism.

Referring now to FIG. 12, there is shown a side schematic view of a second interlock mechanism, referred to as a vertical position interlock. Another roller-style vertical limit switch 94 engages a vertical feed dog 51 once agitation mechanism 75 is lowered so that the lower surface of universal guard 168 is below the lip of the vessel, not shown. A concentrically oriented vessel, not shown, allows agitation mechanism 75 to be lowered enough to engage vertical limit switch 94 and close this portion of the safety circuit. An off-center vessel or a vessel with an obstruction will not allow agitation mechanism 75 to be lowered enough to engage vertical position interlock. This is an important safety feature since rotating paddle 157 may be exposed to an operator if the vessel, not shown, is not concentrically oriented.

Figure 13:
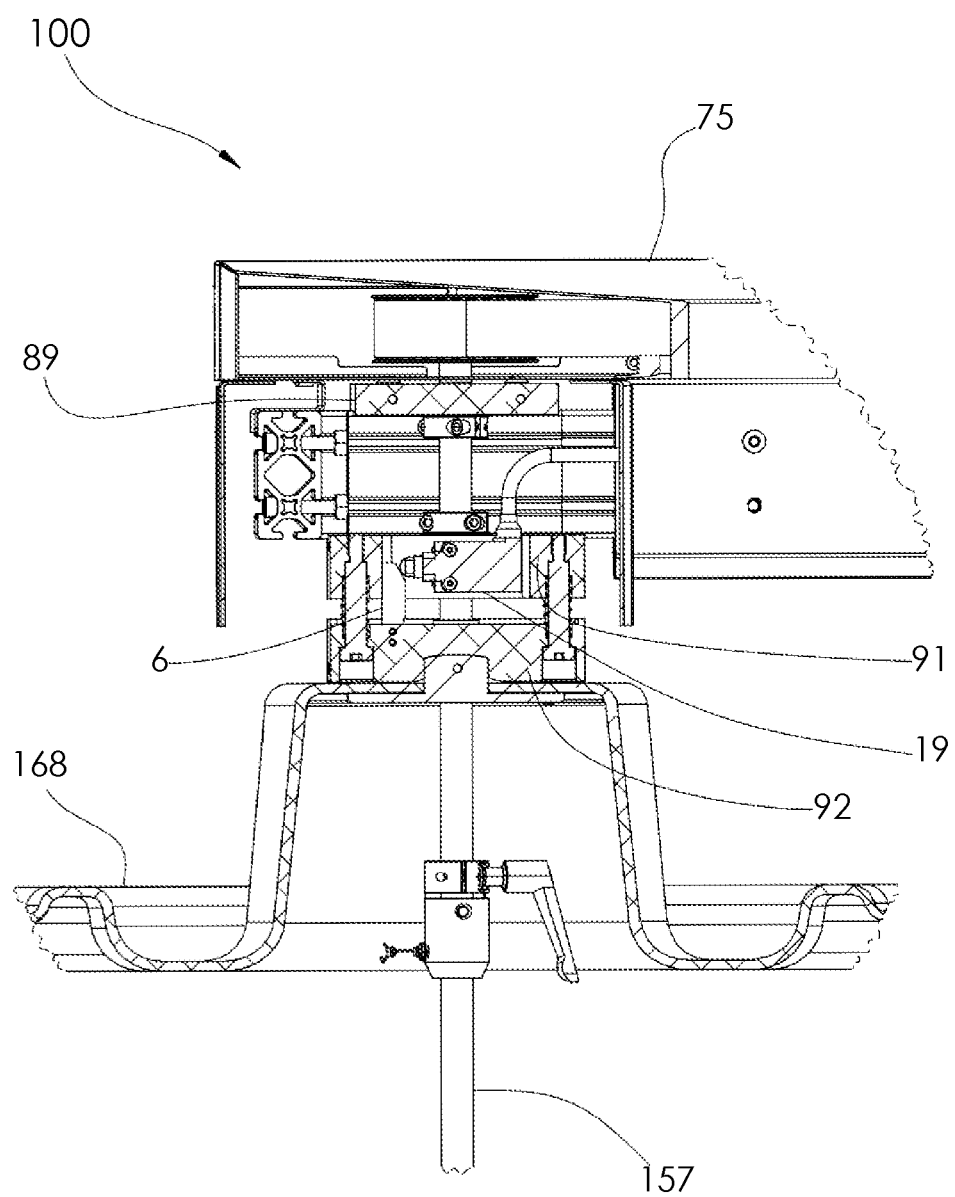
FIG. 13 is an isolated front schematic view of a guard interlock mechanism.

Referring now to FIG. 13, there is shown a front schematic view of a third interlock mechanism, referred to as a guard compression interlock. The purpose of guard compression interlock is to ensure that universal guard 168 is engaged with the lip of the vessel, not shown, preventing fingers from reaching inside the vessel while paddle 157 is in motion. Universal Guard 168 attaches to a guard mount bracket 92 and guard feed dog 6. When agitation mechanism 75 is lowered into position and engages with a lip of vessel, universal guard 168, guard mount bracket 92, and guard feed dog 6 all move together vertically until the guard mount bracket 92 meets a lower driven bearing block 91, which is attached to a floating driven block 89 for belt tensioning. A roller style guard limit switch 19 is mounted to lower driven bearing block 91. A guard feed dog 6 is mounted to guard mounting bracket and engages guard limit switch 19 once the assembly has fully compressed.

Figure 14:
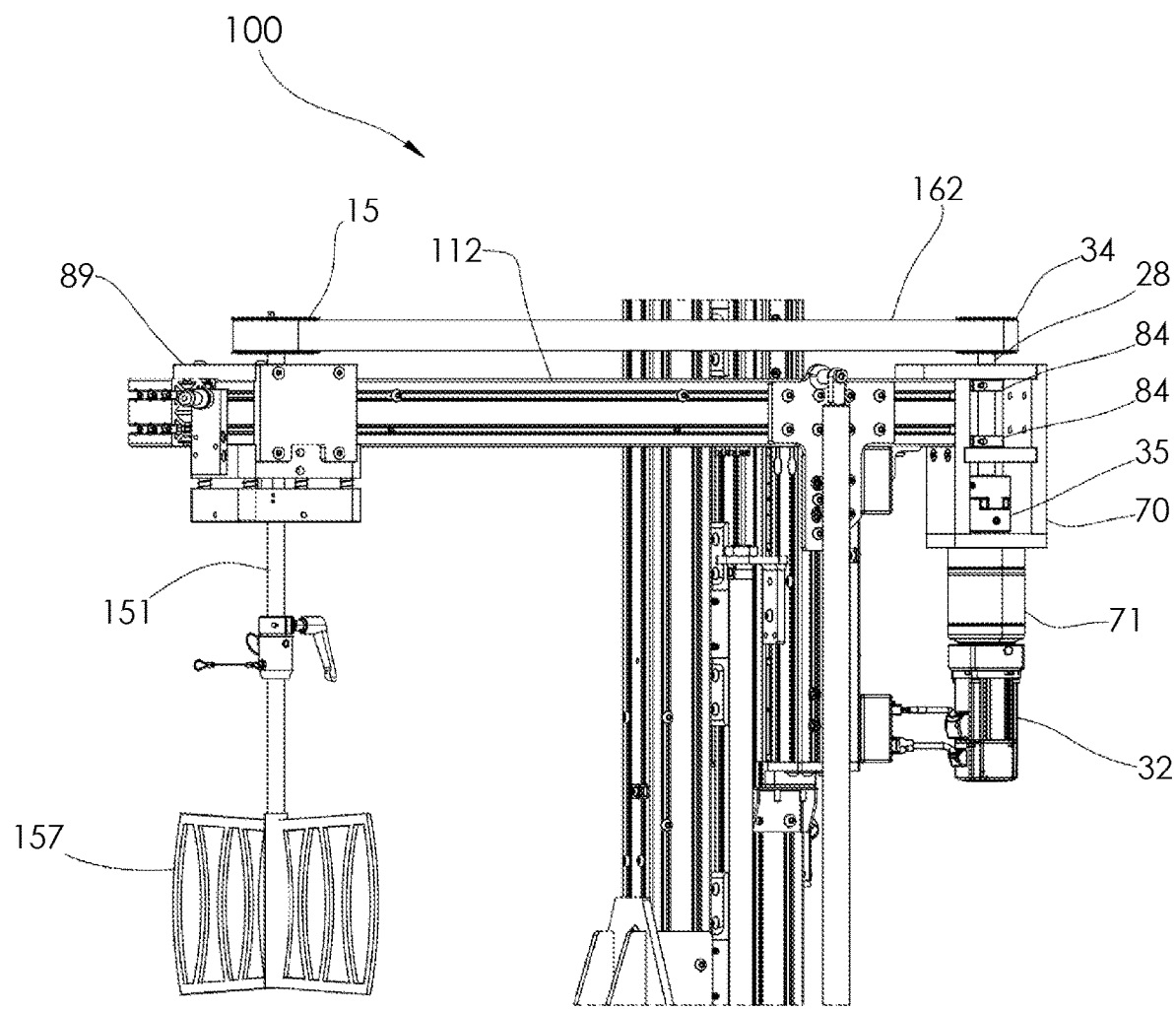
FIG. 14 is a front schematic view of the drive system of the separator with the sheet metal enclosures removed.

Referring now to FIG. 14, there is shown a side schematic view of a portion of separator 100 with attached rotating paddle 157. Rotary motion is provided by a servo motor 32 connected inline with a gearbox 71. The output from the gearbox is connected to a spider coupler 35 which transfers torque to a keyed shaft 28 and drive pulley 34. Drive pulley 34 transfers torque across the length of agitation mechanism 75 via a single drive belt 162, to a driven pulley 15. Driven pulley 15 is attached to a paddle drive shaft 151 which connects to a paddle with a quick connect coupler 157.

A fixed drive block 70 mounts motor 32 and gearbox 71 securely to horizontal agitation mechanism frame 112. Bearings are pressed in the fixed drive block 70 and a pair of clamping shaft collars 84 keep the shaft from moving axially.

Figure 15:
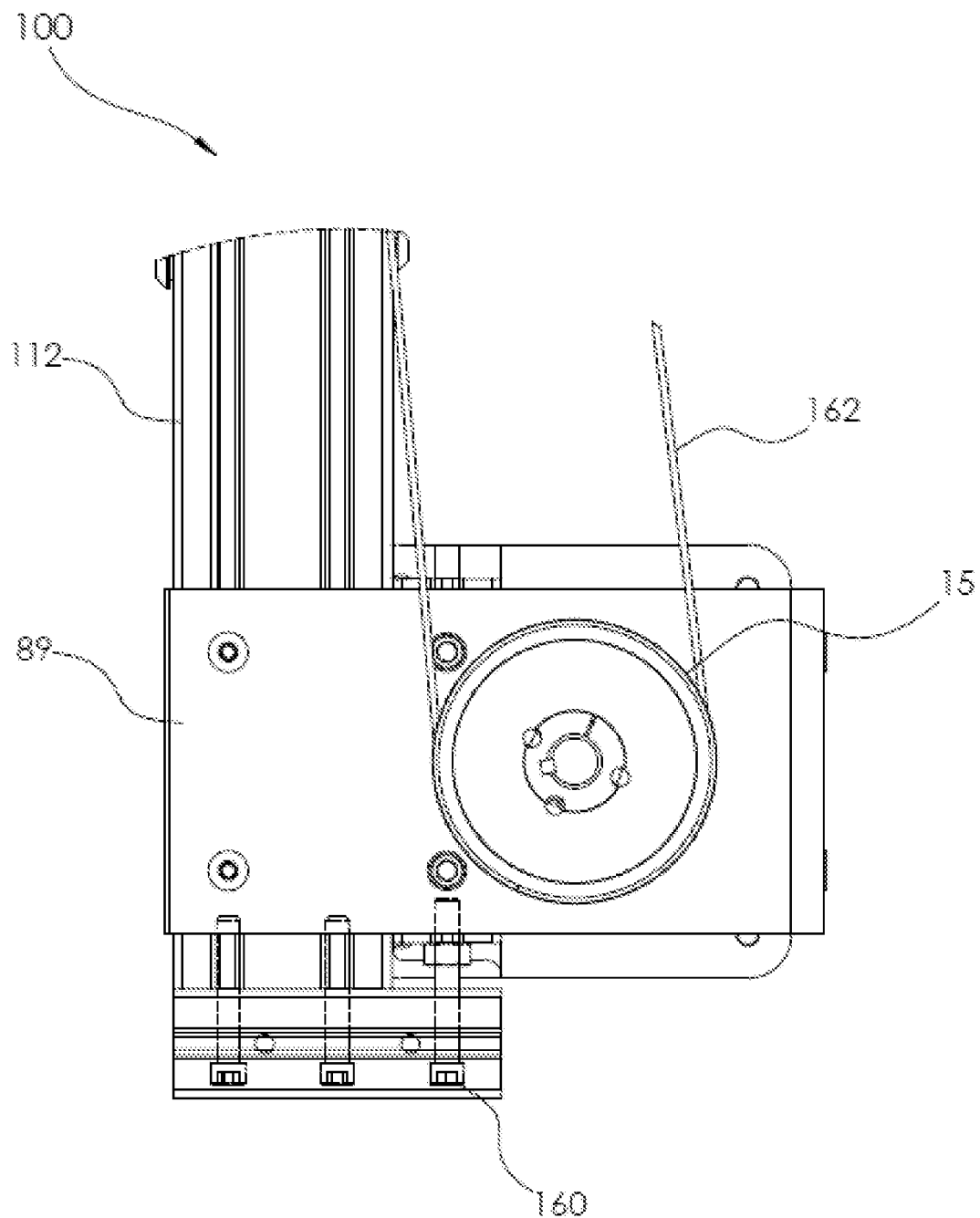
FIG. 15 is a top schematic view of a portion of the separator showing the floating driven block, belt, pulley, and tensioning bolts.

Referring now to FIG. 15, there is shown a floating driven block 89 travels along the horizontal agitation mechanism frame 112 to allow for tensioning of the drive belt 162. Two belt tensioning screws 160 pull the floating driven block 89 away from the fixed driven block, not shown. A frequency meter is used to properly tension the drive belt 162. Once the proper tension is achieved, the floating driven block 89 is secured with multiple fasteners to the horizontal agitation mechanism frame 112 to lock it in place.

Figure 16:
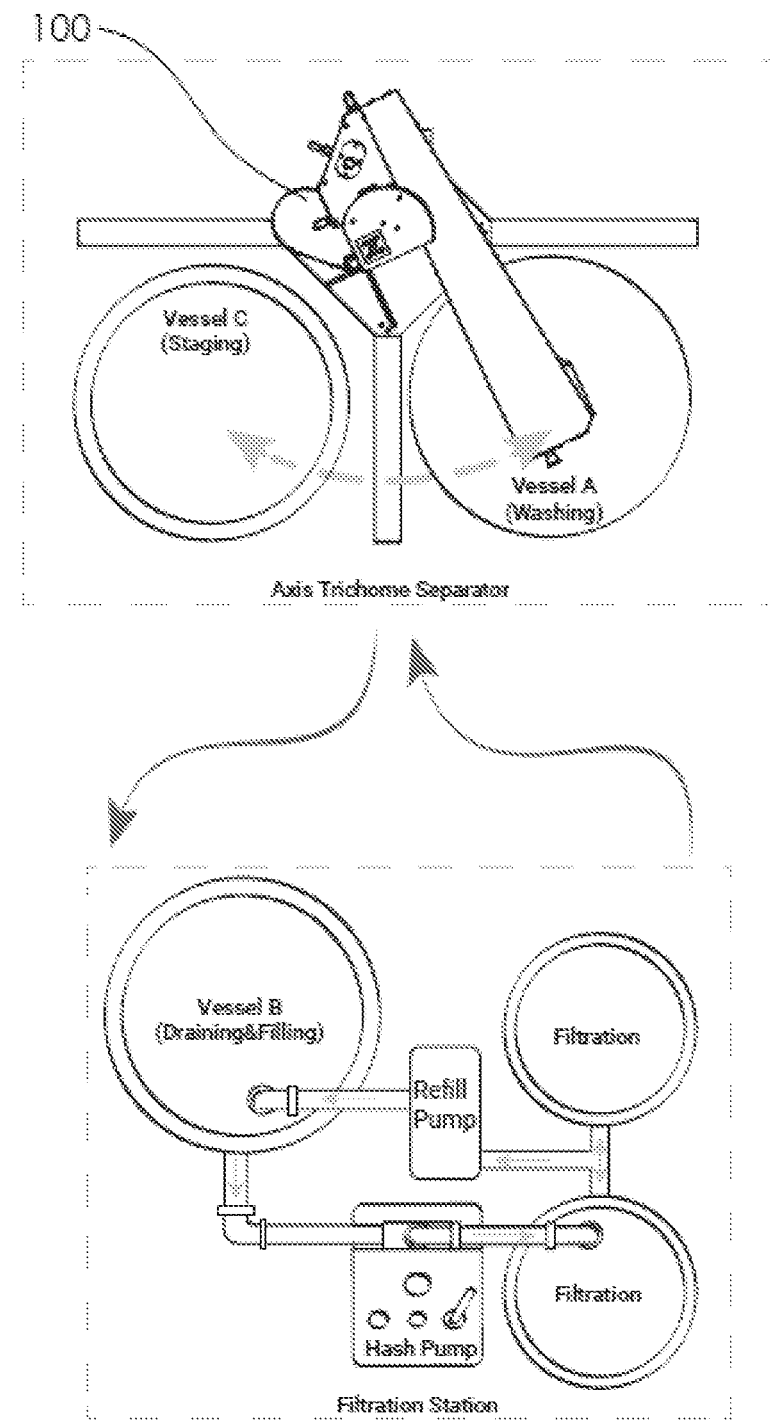
FIG. 16 is a top schematic view illustrating a sequence of events in practicing the invention with four storage vessels simultaneously.

Referring now to FIG. 16, there is shown a top schematic view illustrating a sequence of events in practicing the invention with three storage vessels simultaneously. Any number of vessels can be used in the agitation process, for this example three will be used. Vessel A, labeled washing, would be the current vessel being operated for an agitation cycle, while Vessel B, labeled draining and filling, is at the filtration station. This is where the fluid from Vessel B would be pumped into a filtration vessel for post processing. Once Vessel B is drained it would now be refilled and staged for the next agitation cycle, Vessel C.

An agitation cycle to wash the plant material typically takes approximately 10 to 30 minutes to complete, and operators will wash one batch of plant material multiple cycles. After each cycle there is down time for that batch of material because what is being captured has to settle, get drained from a wash vessel, post filtered in the filtration vessel and refilled in a wash vessel for the next agitation cycle. The relocating agitation mechanism allows the versatility of the vessels to either be fixed or operate in a modular fashion to achieve throughput and production cadence based on the users needs for processing volume.

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a great number of variations of the devices, device components, and method steps set forth in the present description. As will be obvious to one of skill in the art, methods, and devices useful for the present methods can include a great number of optional composition and processing elements and steps.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when compositions of matter are claimed, it should be understood that compounds known and available in the art prior to Applicant's invention, including compounds for which an enabling disclosure is provided in the references cited herein, are not intended to be included in any composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of," and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Having thus described the invention, what is desired to be protected by Letters Patent is presented in the subsequently appended claims.

What is claimed is:

1. A *cannabis* trichome separator, comprising:
   a) at least one storage vessels, the at least one storage vessels each having an open top and adapted to receive a plant material and a chilled or ice water mixture, the plant material and the chilled or ice water forming a plant material and chilled or ice water mixture thereof;
   b) means for agitating the plant material and chilled or ice water mixture;
   c) means for raising, lowering, and relocating the means for agitating the plant material and chilled or ice water mixture for the placement thereof over the open top of each of the at least one storage vessels;
   d) whereby the plant material and chilled or ice water mixture is agitated in each of the at least one storage vessels, seriatim;
   e) a means for agitating the plant material and chilled or ice water mixture by use of a software, a touchscreen interface and a joystick thereby allowing a user to record or create custom patterns and recipes that can be saved, shared and reused; and
   f) a means for protecting the user with a one or multiple safety interlocking devices allowing a machine to relocate and agitate subsequent the plant material and chilled or ice water mixture in subsequent the at least one storage vessels, seriatim, wherein the means for protecting the user includes a universal guard, the universal guard providing positions for each of the at least one storage vessels to key into concentrically.

2. A method for processing raw plant material, the steps comprising:
   a) introducing a plant material and a chilled or ice water into each of at least one storage vessels, the plant material and the chilled or ice water forming a plant material and chilled or ice water mixture thereof;
   b) using means for agitating the plant material and chilled or ice water mixture to agitate the plant material and chilled or ice water mixture in a first of the at least one storage vessels;
   c) relocating the means for agitating the plant material and chilled or ice water mixture from a first position to a second position, wherein a vertical limit switch is engaged when the means for agitating the plant material and chilled or ice water mixture is lowered onto a properly orientated one of the at least one storage vessels; and
   d) using the means for agitating the plant material and chilled or ice water mixture to agitate subsequent the plant material and chilled or ice water mixture in subsequent the at least one storage vessels, seriatim.

3. The *cannabis* trichome separator of claim 1, wherein the means for agitating the plant material and chilled or ice water mixture is configured to replicate a hand paddling process.

4. The *cannabis* trichome separator of claim 1, wherein the means for raising, lowering and relocating the means for agitating the plant material and chilled or ice water mixture includes a pneumatic spring and cylinder to assist an operator in lifting said means for agitating.

5. The *cannabis* trichome separator of claim 1, wherein:
   the at least one storage vessels includes two storage vessels, each storage vessel corresponding to one position of the universal guard; and wherein the means for raising, lowering, and relocating the means for agitating the plant material and chilled or ice water mixture is configured to move between said positions of the universal guard.

6. The method for processing raw plant material of claim 2, wherein, during steps b) and d), the means for agitating the plant material and chilled or ice water mixture is used in a way that replicates a hand paddling process, achieving turbulence without creating high shear forces.

7. The method for processing raw plant material of claim 2, wherein, during step c), the means for agitating the plant material and chilled or ice water mixture is relocated with the assistance of a pneumatic spring and cylinder which assists an operator in lifting said means for agitating.

8. The method for processing raw plant material of claim 2, further comprising providing a universal guard protecting the user during step c), the universal guard providing positions for the at least one storage vessels to key into concentrically.

9. The method for processing raw plant material of claim 8, wherein:
the at least one storage vessels includes two storage vessels, each storage vessel corresponding to one position of the universal guard; and
wherein the means for raising, lowering, and relocating the means for agitating the plant material and chilled or ice water mixture is configured to move between said positions of the universal guard.

10. A *cannabis* trichome separator, comprising:
a) at least one storage vessels, the at least one storage vessels each having an open top and adapted to receive a plant material and a chilled or ice water mixture, the plant material and the chilled or ice water forming a plant material and chilled or ice water mixture thereof;
b) means for agitating the plant material and chilled or ice water mixture;
c) means for raising, lowering, and relocating the means for agitating the plant material and chilled or ice water mixture for the placement thereof over the open top of each of the at least one storage vessels;
d) whereby the plant material and chilled or ice water mixture is agitated in each of the at least one storage vessels, seriatim;
e) a means for agitating the plant material and chilled or ice water mixture by use of a software, a touchscreen interface and a joystick thereby allowing a user to record or create custom patterns and recipes that can be saved, shared and reused;
f) a means for protecting the user with a one or multiple safety interlocking devices allowing a machine to relocate and agitate subsequent the plant material and chilled or ice water mixture in subsequent the at least one storage vessels, seriatim; and
g) a vertical limit switch, wherein the vertical limit switch is engaged when the means for agitating the plant material and chilled or ice water mixture is lowered onto a properly orientated one of the at least one storage vessels.

11. The *cannabis* trichome separator of claim 10, wherein the means for agitating the plant material and chilled or ice water mixture is configured to replicate a hand paddling process.

12. The *cannabis* trichome separator of claim 10, wherein the means for raising, lowering and relocating the means for agitating the plant material and chilled or ice water mixture includes a pneumatic spring and cylinder to assist an operator in lifting said means for agitating.

* * * * *